United States Patent [19]

Suzuki

[11] Patent Number: 5,140,584

[45] Date of Patent: Aug. 18, 1992

[54] PACKET COMMUNICATION SYSTEM AND METHOD OF CONTROLLING SAME

[75] Inventor: Muneyuki Suzuki, Inagi, Japan

[73] Assignee: Kabushiki Kaisha Toshiba, Kawasaki, Japan

[21] Appl. No.: 764,093

[22] Filed: Sep. 23, 1991

Related U.S. Application Data

[63] Continuation of Ser. No. 485,314, Feb. 28, 1990, abandoned.

[30] Foreign Application Priority Data

Mar. 1, 1989 [JP] Japan ............................ 1-50521

[51] Int. Cl.⁵ ........................................ H04Q 11/04
[52] U.S. Cl. .................... 370/60; 370/85.6; 370/94.1
[58] Field of Search ............... 370/60, 60.1, 61, 85.1, 370/85.2, 85.3, 85.4, 85.6, 85.7, 94.1, 95.1; 340/825.5, 825.51, 825.52

[56] References Cited

U.S. PATENT DOCUMENTS

| | | | |
|---|---|---|---|
| 4,607,363 | 8/1986 | Platel et al. ........................ | 370/61 |
| 4,757,529 | 7/1988 | Glapa et al. ........................ | 370/60 |
| 4,849,968 | 7/1989 | Turner ................................. | 370/60 |
| 4,920,534 | 4/1990 | Adelmann et al. ................ | 370/94.1 |
| 4,953,157 | 8/1990 | Franklin et al. ................... | 370/85.6 |

Primary Examiner—Douglas W. Olms
Assistant Examiner—Alpus H. Hsu
Attorney, Agent, or Firm—Finnegan, Henderson, Farabow, Garrett and Dunner

[57] ABSTRACT

A packet communication system which communicates various communication information such as voice, data or images in the form of a packet and which provides a transmission quality which satisfies both of high instantaneousness and low discard properties and a method of controlling the system. A counter counts the respective numbers of stays of packets in priority-classified buffers. The percentages of output of packets from the respective buffers and both of the percentages of output of packets from and the percentages of input of packets to the respective buffers are controlled in accordance with the counted numbers of stays of packets in the respective buffers and information on the priorities of the packets.

12 Claims, 5 Drawing Sheets

PACKET COMMUNICATION SYSTEM AND METHOD OF CONTROLLING SAME

This application is a continuation of application Ser. No. 07/485,314, filed Feb. 28, 1990, now abandoned.

BACKGROUND OF THE INVENTION

1. Field of the Invention

This invention relates to packet communication systems which communicate various communication information on voice, data, images, etc., and methods of controlling same, and more particularly to such a system which provides a transmission quality which satisfies both of high instantaneousness and low discard properties, and a method of controlling the system.

2. Description of the Related Art

Figure 1:
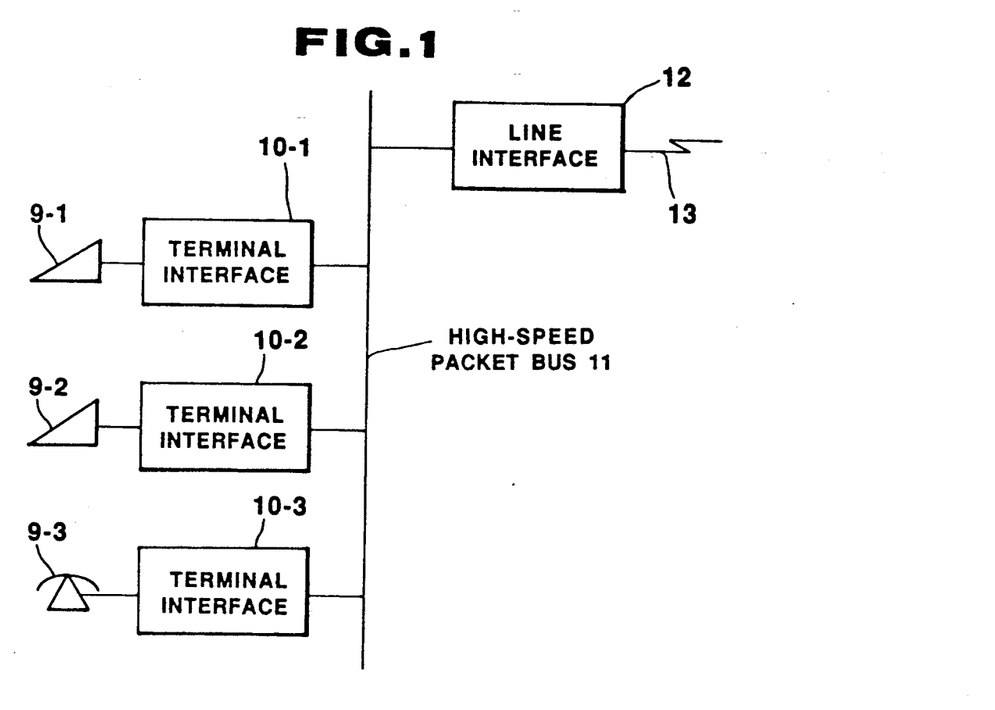
FIG. 1 is a general schematic of a packet communication system.

As shown in a block diagram of FIG. 1, generally, a packet communication system which produces packets of information and transmits various pieces of information on voice, data images, etc., generated from various information terminals includes a high-speed data terminal 9-1, a low-speed data terminal 9-2, a voice terminal 9-3, etc.; terminal interfaces 10-1 to 10-3 corresponding to the respective information terminals; a line interface 12 to a multiplexing line 13; a high-speed packet bus 11 connecting the respective interfaces 10-1 to 10-3 and line interface 12. In this arrangement, the information generated by each of the terminals 9-1 to 9-3 is decomposed to predetermined information units by the corresponding one of the terminal interfaces 10-1 to 10-3, combined with an addressee information, etc., into a communication unit packet and input to the line interface 12 via the high-speed packet bus 11. The line interface 12 selects a multiplexing line 13 connecting to the addressee in accordance with information on the addressee in the input packet and transmits the packet to the multiplexing line 13 on a time-divisional basis.

If communication information generated by the respective terminals 9-1 to 9-3 concentrates in a given time in such packet communication system, so-called congestion of packets occurs in the communication system. In order to cope with this situation, a buffer is conventionally provided generally to store packets as a queue in the line interface 12.

Figure 2A:
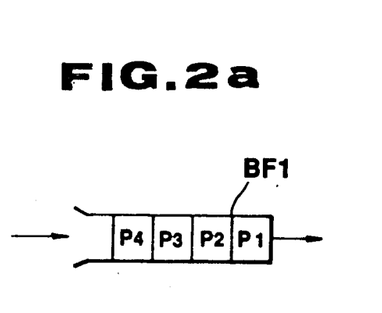
FIGS. 2(a) and 2(b) are a conventional buffer arrangement.

In the buffer structure shown in FIG. 2(a), a buffer BF1 is provided to store and output received packets $P_1$-$P_4$ in the order in which the packets are received. Another buffer arrangement, for example, shown in FIG. 2(b), includes a plurality of buffers $BF_1$-$BF_3$, a demultiplexer DMPX which distributes received packets $P_1$-$P_4$ in accordance with a priority of the packets, and a multiplexer MPX which selects an output packet in accordance with the priority of the packets. In this arrangement, for example, packets $P_1$ and $P_4$ of high priorities are stored in the buffer $BF_1$ and transmitted preferentially while packets $P_1$ and $P_3$ of lower priority are stored in the buffers $BF_2$ and $BF_3$ in accordance with their priorities and are transmitted after the packets $P_1$ and $P_4$ of highest priority are transmitted.

Figure 2B:
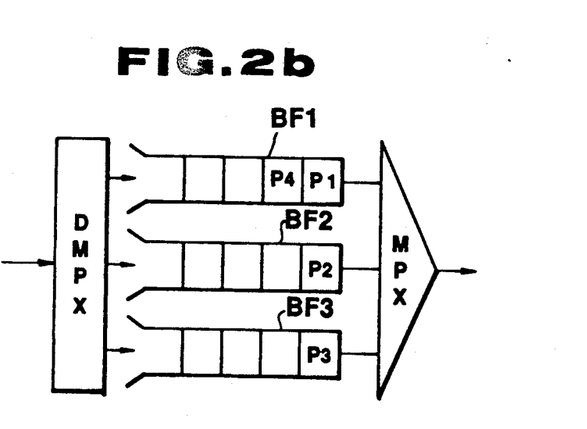

The communication information handled by such a packet communication system is divided mainly into two: information which requires high instantaneousness and whose value itself would be impaired like the information on voice if transmission delay and/or reversal of packets with reference to time occurs; and information which requires a low discard property in order to prevent possible impairment to the meaning of the entire information, for example, caused by a failure of packets in data from data terminals, etc. Therefore, it is necessary to control inputting and/or outputting a packet queue so as to satisfy high instantaneousness and low discard properties of the information even if congestion can be avoided using buffers such as those as shown FIGS. 2(a) and (b).

In the buffer arrangement of FIG. 2(a), packets can only be output in the order of their reception, so that information of high instantaneousness cannot be output preferentially. In the buffer structure of FIG. 2(b), information of high instantaneousness is given high priority, so that it can be output preferentially to thereby ensure high instantaneousness. In such a system, however, information of lower priority increasingly tends to stay in the buffer to thereby cause an overflow and a problem of transmission delay exceeding an acceptable limit because information of higher priority is preferentially processed. In the buffer arrangement of FIG. 2(b), the sequence of packet outputting is determined only in accordance with priority irrespective of the number of packets in the priority-classified buffers. Therefore, if communication information concentrates in the buffer arrangement temporarily from the various information terminals, transmission delays of packets of lower priority would increase and packets would overflow easily. Possible packets arriving after the overflow would be discarded and thereby degrade their transmission quality.

As mentioned above, the prior art packet communication system avoids congestion of packets using one or more buffers, but selects the sequence of information outputting in accordance with priorities of the packets alone irrespective of the number of packets in the buffers. Therefore, transmission delay of packets of lower priorities increases and those packets are easily discarded to thereby cause the problem that a transmission quality having high instantaneousness and low discard properties cannot be obtained.

SUMMARY OF THE INVENTION

It is an object of the present invention to provide a packet communication system and a method of controlling same to thereby solve the above problems to obtain a transmission quality which has high instantaneousness and low discard properties.

The packet communication system according to the present invention includes a plurality of buffers provided for temporarily storing the packets, wherein each buffer stores packets having instantaneousness priority data which is different from the instantaneousness priority data of packets stored in the other buffers, input control means for receiving the packets and writing the received packets into a corresponding one of the plurality of buffers in accordance with the instantaneousness priority data of the received packets, first counting means for counting the number of packets currently stored in each buffer on the basis of the numbers of packets written in and read out from each buffer, and output control means for respectively controlling a frequency at which the packets are to be read from each buffer in accordance with the number of packets stored in each buffer.

In the present invention, the frequencies at which the packets are read from and written into the respective buffers are determined in accordance with the number of packets stored in the respective buffers and the priority data of the packets. The frequency at which the packets are to be read from each buffer is controlled in accordance with the number of packets stored in each buffer and the priority data of the packets stored therein. Thus, so long as the number of packets in any one of the buffers does not exceed a predetermined threshold, the frequency at which the data will be read from the buffer having packets with the highest instantaneousness priority stored therein will be greater than the frequency at which the data will be read from the other buffers. However, if the number of packets in a particular buffer is large, the frequency at which the data will be read from that particular buffer is increased and the frequency at which data will be read from the other buffers will be proportionally decreased. If the total number of packets stored in the buffers exceeds one of a number of specified threshold values, the input of packets to some of the buffers may be inhibited in order prevent an overflow of packets. Therefore, packets of higher priorities are output early to thereby improve the transmission quality of voice, etc., which is required to have high instantaneousness property. Since buffers storing a large the number of packets are selected very frequently, packets of lower priorities are output before the transmission delay becomes large thus ensuring the quality transmission of packets having high instantaneousness and low discard properties. In addition, since the admission of a request for reception of a packet which would cause an overflow of the buffers is inhibited, the overflow of the buffers is prevented beforehand to thereby prevent congestion of the packets.

DESCRIPTION OF THE PREFERRED EMBODIMENT

Figure 3:
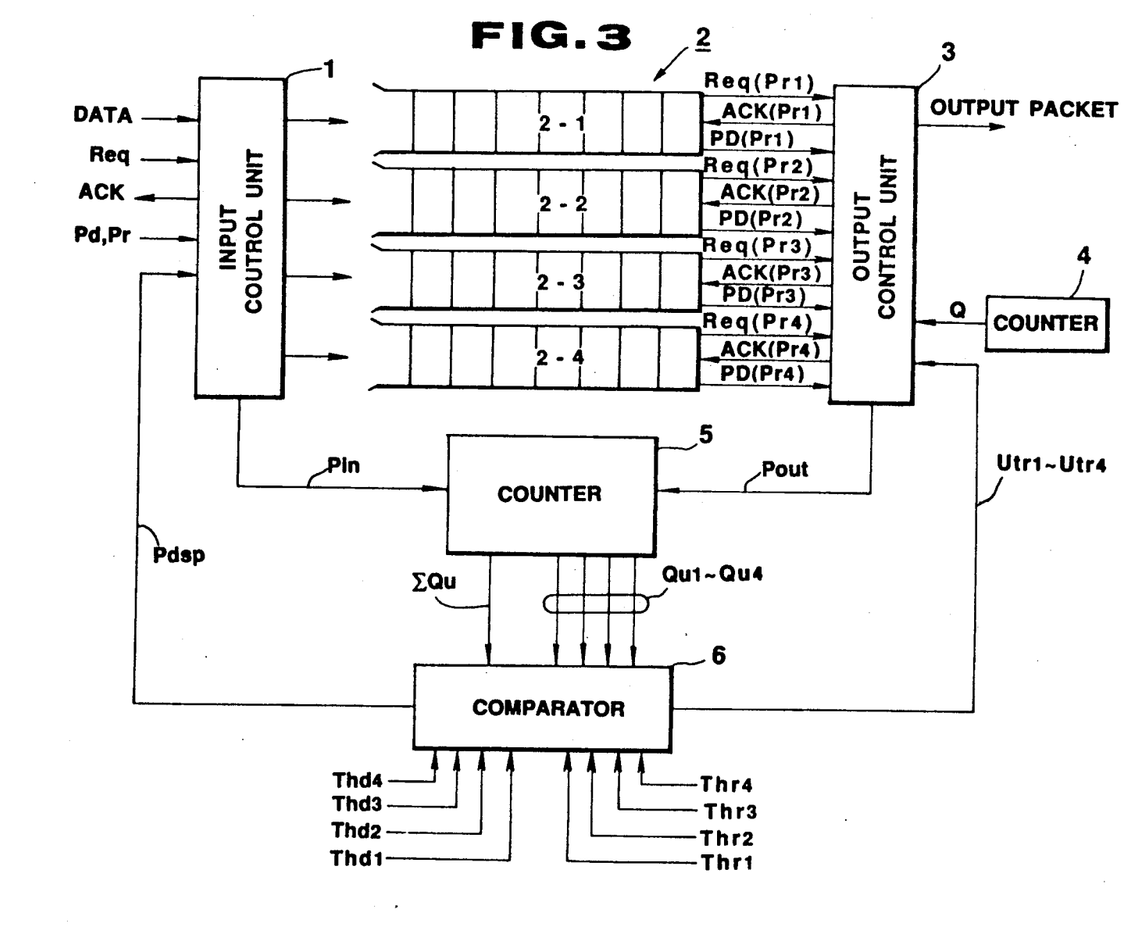
FIG. 3 is a block diagram of one embodiment of a buffer and input and output controllers as the main portion of the present invention.

FIG. 3 is a block diagram of one embodiment of a buffer section and input and output controllers for the buffer section as the main portion of the inventive packet communication system. The embodiment includes an input control unit 1, a buffer section 2 which includes instantaneousness priority-classified buffers 2-1 to 2-4, an output control unit 3, an output control counter 4, a number-of packets counter 5, and comparator 6.

Figure 4:
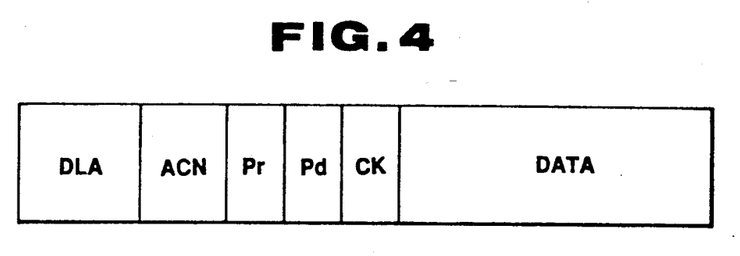
FIG. 4 illustrates the format structure of a packet.

The input control unit 1 receives data DATA of a packet having a format shown in FIG. 4, priority indicative data Pd of two bits, Pd0 and Pd1, concerning discard property and priority indicative data Pr of two bits Pr0 and Pr1 concerning instantaneousness property, and a request for reception Req from a terminal (not shown). The input control unit 1 also receives a packet discarding command signal Pdsp from the comparator 6. The input control unit 1 outputs an acknowledge signal ACK to a terminal which has requested the reception of the packet when the reception of the packet is possible. When the reception of the packet is acknowledged, the input control unit 1 outputs a packet input pulse Pin to the counter 5. The received packet is transferred to and stored in buffers 2-1 to 2-4 of priorities corresponding to the contents of the instantaneousness priority-classified indicative bits Pr0 and Pr1. In the format of the packet of FIG. 4, reference characters DLA denotes the address of a destination terminal to which the packet is to be transferred and ACN the number of an access channel to form the transmission path between the terminal interface which transmitted the packet and the line interface, and CK an error indicative bit.

The output control unit 3 receives packet output request signals Req (Pr1)–Req (Pr4) from buffers 2-1 to 2-4 corresponding to four different priorities Pr1–Pr4 where Pr1 > Pr2 > Pr3 > Pr4 expressed by priority indicative bits Pr0 and Pr1, and packet data PD (Pr1)–PD (Pr4), and outputs output acknowledge signals ACK (Pr1)–ACK (Pr4) to the respective buffers 2-1 to 2-4. It also receives from the output control counter 4 a 4-bit count Q for causing the buffers 2-1 to 2-4 to output packets stored in those buffers in 16 different output patterns, and buffer signals Utr1–Utr4 indicating that the number of packets in the respective buffers 2-1 to 2-4 have exceeded the thresholds Thr1 to Thr4 of the number of packets determined for the corresponding buffers 2-1 to 2-4 (according to priority).

The number-of-packets counter 5 counts respective packets in the priority-classified buffers 2-1 to 2-4 and the overall number of packets using packet input pulses Pin from the input control unit 1 and packet output pulses Pout from the output control unit 3. The respective numbers of packets in the buffers 2-1 to 2-4 are input as counts Qu1–Qu4 to the comparator 6 while the overall number of packets is input as a count value of ΣQu to the comparator 6.

The comparator 6 compares the received counts Qu1–Qu4 from the counter 5 and corresponding thresholds Thr1–Thr4 for the numbers of packets determined according to priority and outputs a buffer stay signal Utri (i=1–4) for a buffer where the relations Qu1 > Thr1, Qu2 > Thr2, Qu3 > Thr3, or Qu4 > Thr4 hold. It also compares the count value ΣQu and respective thresholds Thd1–Thd4 where Thd1 > Thd2 > Thd3 > Thd4 determined according to discard priority property and outputs a signal Pdsp1 which inhibits the reception of packets of all the first to fourth different discard priorities expressed by discard priority indicative bits pd0 and pd1 if ΣQu > Thd1; a signal Pdsp2 which inhibits the reception of packets of the first to third priorities if Thd1 ≧ ΣQu > Thd2; a signal Pdsp3 which inhibits the reception of packets of the first and second priorities if Thd2 ≧ ΣQu > Thd3; and a signal Pdsp4 which inhibits the reception of a packet of the first priority which expresses the highest discard priority if Thd3 ≧ ΣQu > Thd4. These signals Pdspi (i=1–4) are input to the input control unit 1.

Figure 5:
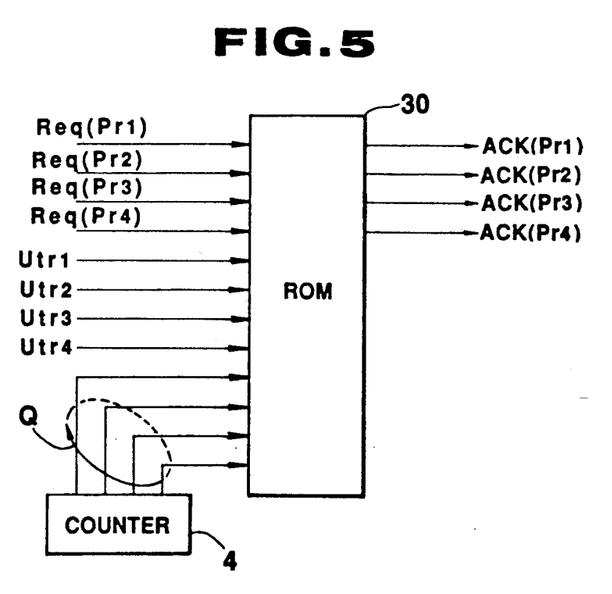
FIG. 5 is a detailed schematic of the output controller.

FIG. 5 illustrates the detailed structure of the main portion of the output control unit 3. It is arranged that the respective output frequencies of the buffers 2-1 to 2-4 are controlled by output acknowledge signals ACK (pr1)–ACK (pr4) stored in the read only memory (ROM) 30.

Figure 6:
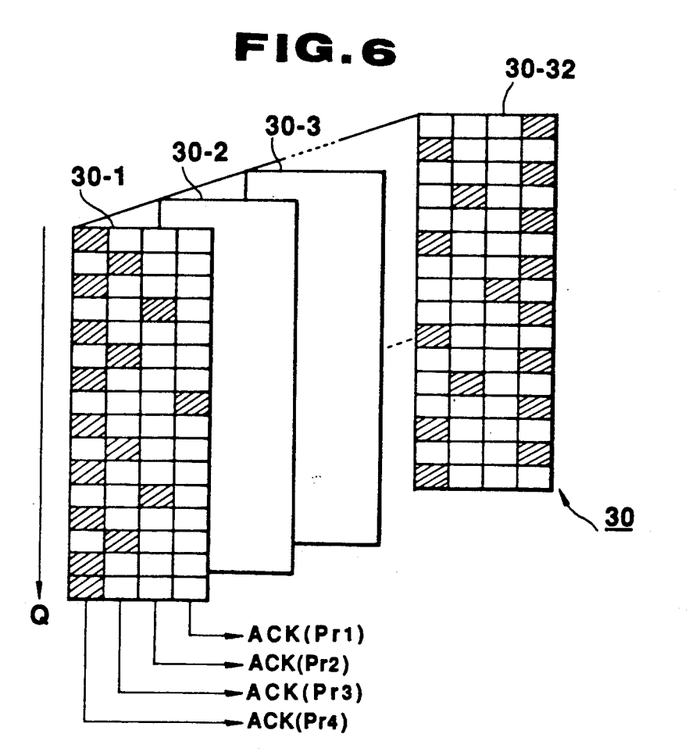
FIG. 6 is a detailed schematic of an output control ROM of FIG. 5.

ROM 30 receives the respective output request signals Req (pr1)-Req (pr 4) from the buffers 2-1 to 2-4, the respective buffer stay signals Utr1-Utr4 from the comparator 6 and counts Q from the output control counter 4. FIG. 6 the shows a simplified version of the present invention wherein ROM 30 includes 32 memory planes 30-1 to 30-32 corresponding to the number of combinations "32" of the maximum value "4" indicative of concurrent generation of packet output requests Req (pr1)-Req (pr4) and kinds of generation of stay signals Utr1-Utr4 "0-5". It should be noted, however, that the number of memory planes is not limited to 32 as shown in FIG. 6. In practice the number of memory planes will correspond to the number of possible combinations of the packet output requests Req(pr1)-Req(pr4) and stay signals Utr1-Utr4. It should be noted that in practice the stay signal for a corresponding buffer cannot have more than one possible value if no packet output for that buffer is received, and therefore, the number of memory planes may be correspondingly be reduced. In FIG. 6, each of the memory planes 30-1 to 30-32 has 16 (rows)×4 (columns) addresses corresponding to combinations of the maximum count "16" of the output control counter 4 and output acknowledge signals ACK (pr1)-ACK (pr4) to the respective buffers 2-1 to 2-4 and beforehand stores output acknowledge signals shown by inclined lines in the addresses in the direction of extension of columns at an appropriate percentage. One of the memory planes 30-1 to 30-32 is selected in accordance with one of combinations of output request signals Req (pr1)-Req (pr4) from the corresponding buffers 2-1 to 2-4 and buffer stay signals Utr1-Utr4. For example, when none of the buffer stay signals Utr1-Utr4 are generated and output request signals Req (pr1)-Req (pr4) are generated from all the buffers, the memory plane 30-1 is selected. The addresses in the direction of row extension in the memory plane 30-1 are selected sequentially in accordance with the count Q of the counter 4, so that output acknowledge signals ACK (pr1)-ACK (pr4) set in the addresses in the direction of row extension are output. For example, when the memory plane 30-1 is selected, ACK (pr1)-ACK (pr4) are output at a ratio of 9:4:2:1. When output request signals Req (pr1)-Req (pr4) are generated from all the buffers 2-1 to 2-4 and the stay of packets occurs in the buffer 2-4, the memory plane 30-32, for example, is selected and the output acknowledge signals ACK (pr1)-ACK (pr4) are output at the ratio of 5:2:1:8. For the priority, the relation pr1>pr2>pr3>pr4 holds.

As mentioned above, since packets of lower instantaneousness priority are output at proper frequencies by changing the frequencies of outputting packets of respective priorities in accordance with combinations of output requests from the buffers 2-1 to 2-4 and the number of packets in the buffers, transmission delay of packets of lower instantaneousness priorities is prevented from increasing. By changing the stored contents of the ROM 30, the number of packets stored in the buffers and transmission delay times of packets of respective priorities can be controlled.

Figure 7:
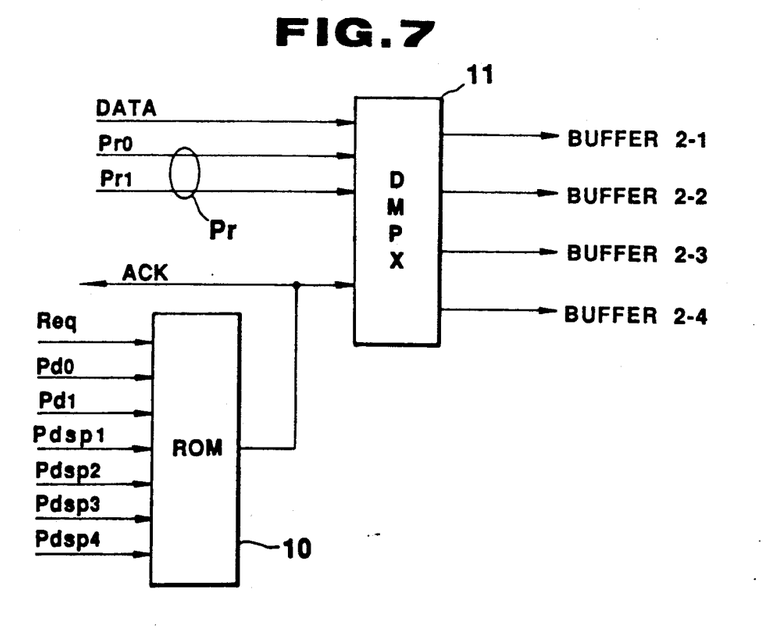
FIG. 7 is a detailed schematic of the input controller.

FIG. 7 is a detailed schematic of the input control unit 1 which includes an input control ROM 10 which determines whether a packet should be accepted or not, and a demultiplexer (DMPX) 11 which determines the instantaneousness priority of the received packet and distributes it to a corresponding buffer. The input control ROM 10 receives an input request signal Req, a discard priority indicative bits pd0-pd1, and packet discard command signals Pdsp1-Pdsp4 as an address signal and outputs an input acknowledge signal ACK when the reception of a packet is permitted. DMPX 11 receives packet data DATA, instantaneousness priority indicative bits pr0-pr1 and an input acknowledge signal ACK.

As mentioned above, the comparator 6 compares the total count $\Sigma Qu$ of packets in all the buffers 2-1 to 2-4 and discard thresholds Thd1-Thd4 (where Thd1>Thd2>Thd3>Thd4) and outputs a signal Pdsp1 which inhibits the reception of packets of all four kinds (or the first to fourth) of discard priorities expressed by bits pd0-pd1; a signal Pdsp2 which inhibits the reception of packets of the first to third priorities (in other words, admits the reception of only a packet of the lowest discard property) if $\Sigma Qu > Thd2$; a signal Pdps3 which inhibits the reception of packets of the first and second priorities if $\Sigma Qu > Thd3$; and a signal Pdsp4 which inhibits the reception of a packet of the first priority (or the highest discard priority) if $\Sigma Qu > Thd4$. When the input control ROM 10 receives an input request signal Req, it determines whether the discard priority of the input packet indicated by the discard priority indicative bits pd0 and pd1 corresponds to the priority in which the reception of the input packet is inhibited by the discard indicative signals Pdsp1-Pdsp4. If not, it outputs an input acknowledge signal ACK. Thus, the received packet is distributed by the DMPX 11 and stored in a buffer of a priority indicated by instantaneousness priority indicative bits pr0 and pr1. If the discard priority of the input packet indicated by the discard priority indicative bits pd0 and pd1 corresponds to the priority in which the reception of the packets is inhibited by the discard indicative signals Pdsp1-Pdsp4, the control ROM10 outputs no input acknowledge signal ACK. Thus, the input packet is discarded without being input into the system.

Figure 8:
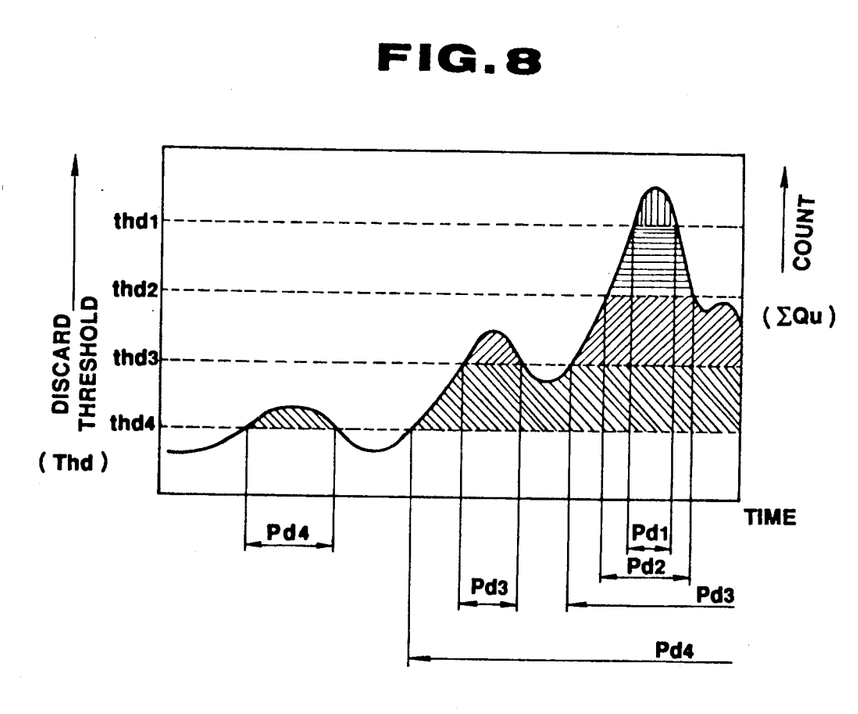
FIG. 8 illustrates the discard threshold of an input packet in accordance with the number of packets stored in the buffers in relation to time.

Therefore, if the total count $\Sigma Qu$ of packets stored in the buffers changes as shown by the curve of FIG. 8, the packet the input request of which is made is discarded as shown by hatched portion in FIG. 7 in accordance with its discard priority to thereby avoid excessive congestion of packets.

While in the above embodiment the buffer group is composed of four buffer rows, it should be noted that the number of buffer rows may be set to any value, of course. While the output frequency of packets is controlled by the output control ROM, it may be controlled by a microprocessor.

What is claimed is:

1. A packet communication system which produces packets of information from communication information received from one of a plurality of types of sources, wherein the packets include a portion of the communication information and control information which includes instantaneousness priority data representative of the degree of instantaneousness required to transmit the communication information, and discard priority data representative of the degree to which a portion of the communication data may be discarded without significantly effecting the quality of the transmission of the communication information, the system comprising:

a plurality of buffers provided for temporarily storing said packets, wherein each buffer stores packets having instantaneousness priority data which is different from the instantaneousness priority data of packets stored in the other buffers;

input control means for receiving the packets and writing the received packets into a corresponding one of the plurality of buffers in accordance with the instantaneousness priority data of the received packets;

first counting means for counting the number of packets currently stored in each buffer on the basis of the numbers of packets written in and read out from each buffer; and output control means for respectively controlling a frequency at which the packets are to be read from each buffer in accordance with the number of packets stored in each buffer.

2. The packet communication system of claim 1, further comprising:

comparing means for comparing the number of packets stored in each buffer with a plurality of first threshold values set for each of the respective buffers, wherein said output control means further controls the frequency at which the packets are read from each buffer in accordance with the output of said comparing means.

3. The packet communication system of claim 2, wherein said output control means further controls the frequency at which the packets are read from each buffer in accordance with the output of said comparing means and output requests from the buffers.

4. The packet communication system of claim 2, further comprising:

output control counter means for repetitively outputting a count value which is incremented by a predetermined value in synchronism with a predetermined clock signal, wherein said output control means further controls the frequency at which the packets are read from each buffer in accordance with the output of said comparing means, the output requests from the buffers, and a count value of said output control counter means.

5. The packet communication system of claim 4, wherein said output control means includes a memory including a plurality of addressable memory planes corresponding in number with the number of possible combinations of the outputs of said comparing means and the output requests from the respective buffers such that each of the memory planes are addressed by a particular combination of outputs from said comparing means and output requests from the respective buffers, each memory plane causes an output acknowledge signal to be output to a selected one of the buffers each time the count value of said output control counter means is incremented, and the output acknowledge signal permits said output control means to read a packet from the selected buffer.

6. The packet communication system of claim 1, further comprising:

second counting means for counting the total number of packets stored in all of the plurality of buffers on the basis of the numbers of packets written in and read out from the plurality of buffers, wherein said input control means controls writing of packets into the respective buffers in accordance with the total number of packets stored in the plurality of buffers.

7. The packet communication system of claim 6, further comprising:

comparing means for comparing the total number of packets stored in the plurality of buffers with a plurality of second threshold values set in accordance with the discard priority data, wherein said input control means controls writing of packets into the respective buffers in accordance with a comparison result of said comparing means.

8. The packet communication system of claim 7, wherein said input control means controls writing of packets into the respective buffers in accordance with the comparison result of said comparing means and input requests for the buffers.

9. The packet communication system of claim 8, wherein said input control means includes a memory for storing a plurality of input acknowledge signals which permit writing of packets into the respective buffers, wherein each of the input acknowledge signals is addressable with respect to the comparison result of said comparing means, the input requests, and the discard priority data, and wherein the input control means controls writing of packets into the respective buffers in accordance with the input acknowledge signal read out from said memory.

10. A packet communication system which produces packets of information from communication information received from one of a plurality of types of sources, wherein the packets include a portion of the communication information and control information which includes instantaneousness priority data representative of the degree of instantaneousness required to transmit the communication information, and discard priority data representative of the degree to which a portion of the communication data may be discarded without significantly effecting the quality of the transmission of the communication information, the system comprising:

a plurality of buffers provided for temporarily storing said packets, wherein each buffer stores packets having instantaneousness priority data which is different from the instantaneousness priority data of packets stored in the other buffers;

counting means for counting the number of packets stored in each buffers and the total number of packets stored in all of the plurality of buffers on the basis of the numbers of packets written in and read out from each of the buffers;

comparator means for comparing the numbers of packets stored in the respective buffers with a plurality of first threshold values which are set in association with the plurality of buffers to output an output control signal indicating that the number of packets stored in each buffer respectively exceeds each of the plurality of first threshold values, and for comparing the total number of packets stored in the plurality of buffers with a plurality of second threshold values which are set in association with the discard priority data to output a plurality of acknowledge inhibiting signals indicating that the total number of packets stored in the respective buffers respectively exceeds each of the plurality of second threshold values;

output control counter means for repetitively outputting a count value which is incremented by a predetermined value in synchronism with a predetermined clock signal, input control means for controlling writing of packets into the respective buffers in accordance with the acknowledge inhibiting signals output from said comparator means, input requests for the buffers, the discard priority data, and the instantaneousness priority data; and output control means for controlling a frequency at which the packets are read from each buffer in accordance with the output control signal output from said comparator means, the output requests from the respective buffers, and count values of said output control counter means.

11. A method of controlling a packet communication system which produces packets of information from communication information received from one of a plurality of types of sources, wherein the packets include a portion of the communication information, an addressee's address, and control information which includes instantaneousness priority data representative of the degree of instantaneousness required to transmit the communication information, and discard priority data representative of the degree to which a portion of the communication data may be discarded without significantly effecting the quality of the transmission of the communication information; stores the packets in a plurality of buffers, wherein each of a plurality of buffers stores packets having instantaneousness priority data which is different from the instantaneousness priority data of packets stored in the other buffers; reads the packets out of the respective buffers according to the instantaneousness priority data; and transmits the packets to an addressee's address, the method comprising the steps of:

counting the number of packets stored in each buffer; and controlling output of packets from each buffer in accordance with the counted number of packets stored in each buffer.

12. A method of controlling a packet communication system which produces packets of information from communication information received from one of a plurality of types of sources, wherein the packets include a portion of the communication information, and addressee's address, and control information which includes instantaneousness priority data representative of the degree of instantaneousness required to transmit the communication information, and discard priority data representative of the degree to which a portion of the communication data may be discarded without significantly effecting the quality of the transmission of the communication information; stores the packets in a plurality of buffers, wherein each of a plurality of buffers stores packets having instantaneousness priority data which is different from the instantaneousness priority data of packets stored in the other buffers; reads the packets out of the respective buffers according to the instantaneousness priority data; and transmits the packets to an addressee's address, the method comprising the steps of:

counting the number of packets stored in each buffer;

counting the total number of packets stored in the plurality of buffers;

controlling input of packets into the buffers in accordance with the total number of packets stored in the plurality of buffers and the discard priority data; and controlling output of packets from the respective buffers in accordance with the respective numbers of packets stored in the respective buffers.

* * * * *

UNITED STATES PATENT AND TRADEMARK OFFICE
CERTIFICATE OF CORRECTION

PATENT NO. : 5,140,584
DATED : August 18, 1992
INVENTOR(S) : Muneyuki SUZUKI

It is certified that error appears in the above-identified patent and that said Letters Patent is hereby corrected as shown below:

Title page, item [57]
Abstract, line 7, change "numbers of stays of packets" to --numbers of packets stored--.

Title page, item [57]
Abstract, line 12, change "numbers of stays of packets" to --numbers of packets stored--.

Claim 12, column 10, line 8, change "and" to --an--.

Signed and Sealed this

Eleventh Day of January, 1994

Attest:

BRUCE LEHMAN

*Attesting Officer*     *Commissioner of Patents and Trademarks*